United States Patent [19]

Hufnagel

[11] Patent Number: 4,620,790
[45] Date of Patent: Nov. 4, 1986

[54] SYSTEM FOR DETERMINING OPTICAL ABERRATIONS OF A TELESCOPE OPTICAL SYSTEM

[75] Inventor: Robert E. Hufnagel, Ridgefield, Conn.

[73] Assignee: The Perkin-Elmer Corporation, Norwalk, Conn.

[21] Appl. No.: 599,909

[22] Filed: Apr. 13, 1984

[51] Int. Cl.[4] .............................................. G01B 9/06
[52] U.S. Cl. .................................. 356/124; 250/201; 356/121
[58] Field of Search ................... 356/121, 124, 124 S; 250/203 R, 201, 201 PF

[56] References Cited

U.S. PATENT DOCUMENTS

| | | | |
|---|---|---|---|
| 2,931,911 | 5/1980 | Nichols | 250/203 R |
| 4,141,652 | 2/1979 | Feinlab | 356/121 |
| 4,370,551 | 1/1983 | Fukuhara et al. | 250/201 PF |
| 4,438,330 | 3/1984 | Hardy | 250/201 |

FOREIGN PATENT DOCUMENTS 731911 4/1966 Canada ................................ 356/124

OTHER PUBLICATIONS

Wyart, J. C., "Use of an AC Heterodyne Lateral Shear Interferometer with Real Time Wavefront Correction Systems".

*Optics*, Klein, John Wiley & Sons, 1970, p. 114.

*Primary Examiner*—R. A. Rosenberger
*Assistant Examiner*—Crystal D. Cooper
*Attorney, Agent, or Firm*—Thomas P. Murphy; Edwin T. Grimes; Francis L. Masselle

[57] ABSTRACT

This invention is directed to a new and improved system for determining optical aberrations, such as for example alignment, focus, tilt, astigmatism or coma of a telescope optical system, wherein the telescope optical system is arranged for imaging a random scene and includes a plurality of subapertures, said system comprising a grating disposed at the focal plane of the telescope optical system, an apodizing mask disposed adjacent the grating, said mask having transparent and opaque portions, an array of light detectors, a field lens disposed adjacent the grating for causing the subapertures to be imaged on the array of detectors, apparatus for effecting relative movement between the grating and the other elements, phase detector electronics for receiving the output from the detectors and outputting individual detector signals, and a processor responsive to the detector signals for determining the difference in phase between the individual detector signals and a reference phase, whereby a measure of the aberration at each subaperture is effected.

9 Claims, 8 Drawing Figures

SYSTEM FOR DETERMINING OPTICAL ABERRATIONS OF A TELESCOPE OPTICAL SYSTEM

FIELD OF INVENTION

This application is directed to optical systems, and, more particularly, to a new and improved system for determining optical aberrations, such as for example alignment, focus, tilt, astigmatism or coma, of a telescope optical system.

BACKGROUND OF THE INVENTION

Heretofore, many different types of alignment and focusing systems have been employed with telescopic optical systems and they have met with reasonable success. However, larger space telescopes viewing extended objects such as the earth or a galaxy require new and improved means for measuring and correcting the optical aberrations of the telescopic system, and, when light weight mirrors are employed, active control of the mirror configuration is also needed. In the case of a segmented mirror optical system, the system of the invention is particularly suitable for sensing misalignment of the individual mirror segments without development of sensing instruments at the mirror center of curvature or at the secondary mirror, thereby eliminating the large structure required to reach the center of curvature or obscuring the aperture.

One of the features of the present invention is that it is operable when viewing an unbounded random scene, whereas previous instruments of this type required a point source; such as a star for example or a bounded scene, such as a planet, for successful operation.

SUMMARY OF INVENTION

Briefly, the present invention is directed to a new and improved system for determining optical aberrations in a telescope optical system wherein the telescope optical system is arranged for imaging a random scene, said system including grating means disposed at the focal plane at the telescope optical system, an apodizing mask having transparent and opaque portions disposed adjacent the grating means. The system further includes an array of light detectors, each of the light detectors being positioned to receive the image of a subaperture portion of the telescope optical system. Means are provided for effecting relative movement between the grating means and said other elements. In addition, the system includes means responsive to the light detectors for determining the difference in phase between the individual detector signals and the average phase of all the detectors, or a reference phase, whereby a measure of the aberration at each subaperture portion of the telescope optical system is effected. In accordance with one aspect of the invention the apodizing mask has a gradual gradient transition between the transparent and opaque portions. Further, according to one aspect of the invention a field lens is disposed adjacent the grating for causing the subaperture portions of the telescope optical system to be imaged on the array of light detectors, respectively.

There has thus been outlined rather broadly the more important features of the invention in order that the detailed description thereof that follows may be better understood, and in order that the present contribution to the art may be better appreciated. There are, of course, additional features of the invention which will be described more fully hereinafter. Those skilled in the art will appreciate that the conception on which this disclosure is based may readily be utilized as the basis for the designing of other systems for carrying out the several purposes of the invention. It is important, therefore, that this disclosure be regarded as including such equivalent systems as do not depart from the spirit and scope of the invention.

Several embodiments of the invention have been chosen for purposes of illustration and description and are shown in the accompanying drawings forming a part of the specification.

DETAILED DESCRIPTION OF PRESENTLY PREFERRED EMBODIMENTS OF THE INVENTION

Figure 1:
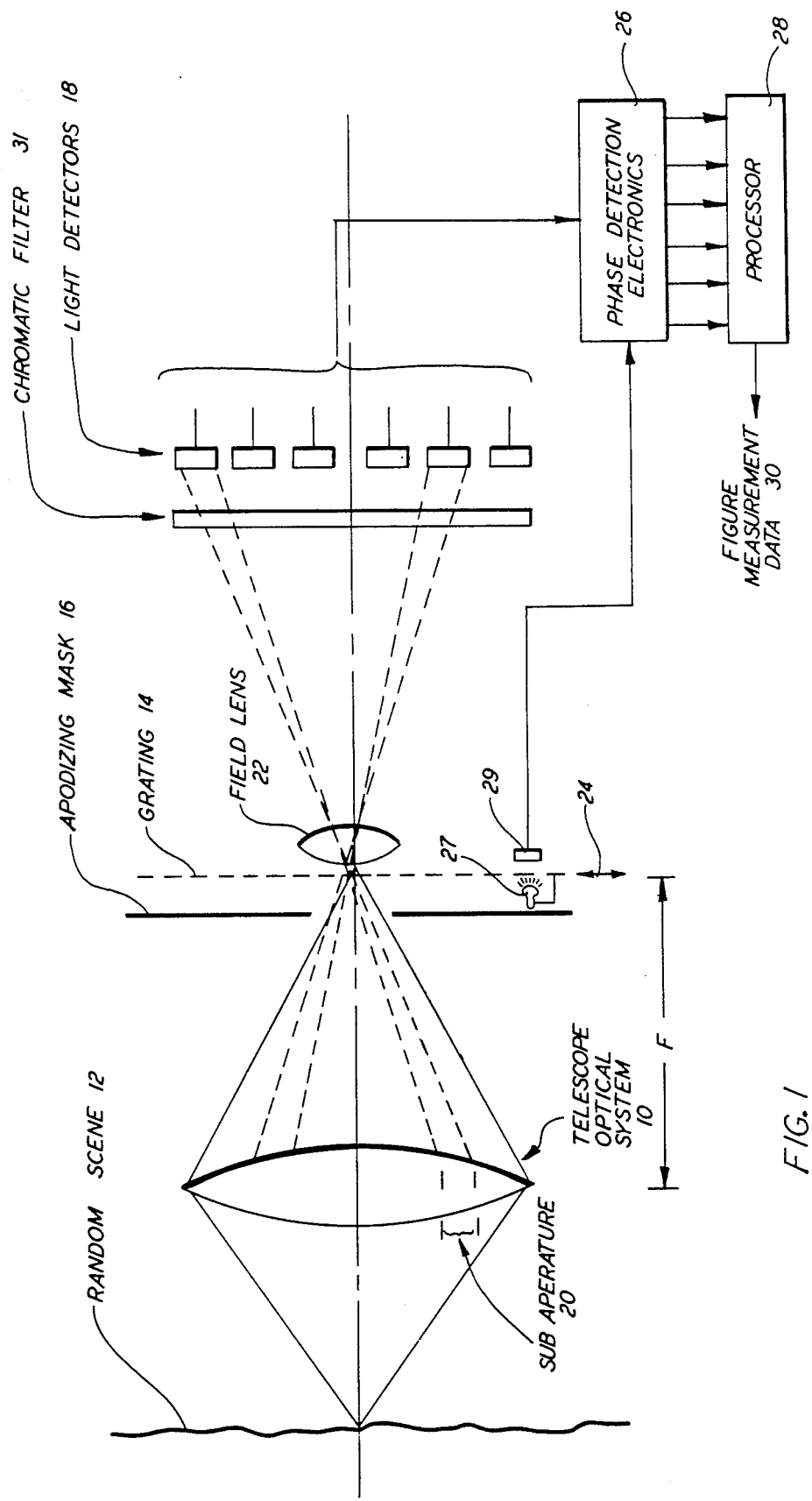
FIG. 1 is a schematic illustration of one form of the invention.

In the form of the invention illustrated in FIG. 1, a system for determining optical aberrations in a telescope optical system according to the invention is shown. This system comprises a telescope optical system indicated at 10 for imaging a random scene indicated at 12. It will be appreciated that the system of the present invention is operative using a random scene as a source, whereas prior art such systems required a compact source. That is, the system of the present invention can work on an unbounded extended source, whereas with the prior art the source had to be bounded within the field of view of the sensor.

A grating 14 is mounted at the focal plane of the telescope optical system. The focal length of this system is indicated as F in FIG. 1. As a result the scene 12 is imaged by the telescope optics 10 on the grating.

An apodizing mask 16 is mounted adjacent the grating. This mask has transparent and opaque portions, which in one form thereof comprise a circular symmetrical transparency that is transparent at the center and reduces in transmission to become opaque at the edge, as will be discussed more fully hereinafter.

Further, the new system of this invention includes an array of light detectors indicated at 18 in FIG. 1. Each of said light detectors is positioned to receive the image of a subaperture portion, indicated at 20, of the telescope optical system 10. A field lens 22 is located adjacent the grating 14 to cause the subapertures 20 of the main telescope aperture to be imaged on the array of light detectors 18, respectively. It is noted that the grating 14 is located at the focal plane of the telescope optical system. The apodizing mask 16 and the field lens 22 are mounted adjacent the grating 14 and they can be on either side of the focal plane. Either one of the two elements could be on the front side of the focal plane while the other element is on the back side of the focal plane. Also, it is possible that the mask and lens could be made integral.

In operation, the telescope is scanned over the scene so that the image moves relative to the grating, but it is also possible to hold the telescope fixed and move the grating. That is, there must be relative movement between the grating and said other elements, as indicated by arrow 24, whereby random detail in the scene is modulated by the fixed grating frequency. If there is an aberration in the telescope optics, the image of the scene produced by each subaperture will be laterally displaced in some way, depending upon the nature of the aberration, relative to the images produced by the other subapertures. These displacements manifest themselves as differences in phase in the modulated signals at the output detectors. Phase detection electronics 26 are provided for receiving the output from the detectors 18 and outputting individual detector signals. A processor 28, responsive to said detector signals, serves to determine the difference in phase between the individual detector signals and the average phase of all the detectors, whereby a measure of the aberration at each subaperture is effected, as indicated at 30.

In the form of the invention where the telescope is stationary or fixed and the grating 14 is moved as indicated by arrow 24, the reference signal can be determined by picking the signal directly off the grating itself rather than averaging the signals from all of the detectors 18. That, is, a small light bulb 27 is fixedly mounted on the grating 14 to shine through and a photocell 29 detects same and generates a signal which is in perfect synchronism with the system. This signal is fed to the phase detection electronics 28 and is used as the reference signal to which the individual detector signals are compared. Typically, the sine and cosine components are detected or measured. That is, an in phase and quadrature detector is used to measure the signal and then the phase angle is computed in the processor 28 for each subaperture in the telescope optics. These phase angles are compared, thereby recreating the wavefront of the system.

In effect, the wavefront tilt over each subaperture is measured, and by properly arranging the configuration and number of detectors, the data can be processed to yield the Zernike polynomial representation of the pupil function.

In some systems, a chromatic filter 31 is mounted at a suitable location in the optical path, such as for example, near the detectors, in the field lens or in the apodizing mask. This filter serves to enhance the contrast of the scene, which is desirable because it is the contrast or brightness variation of the extended scene that is going to give the signal.

Figure 2:
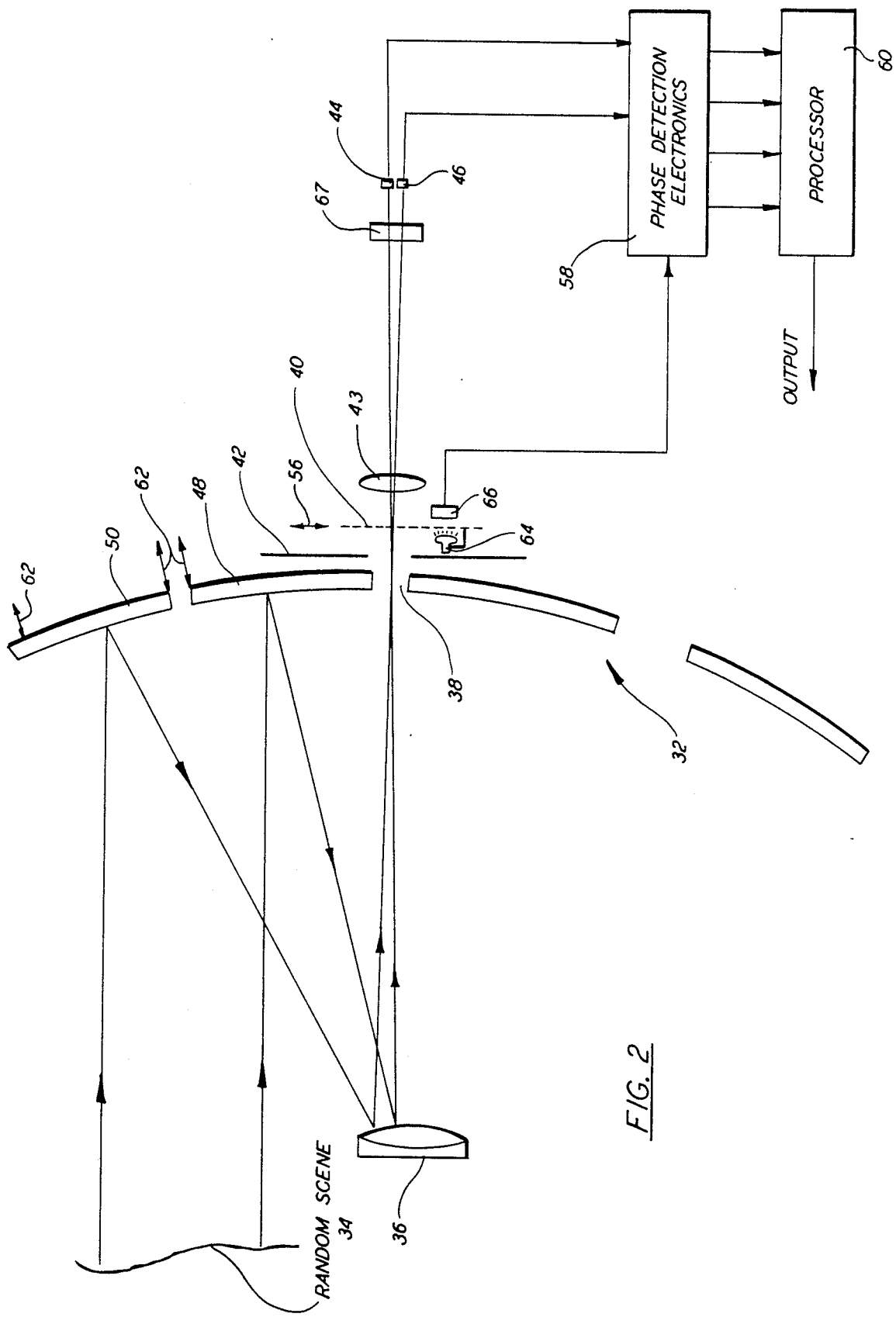
FIG. 2 is a schematic illustration of a second form of the invention.

Referring next to the embodiment of FIG. 2, the application of the invention to a segmented optical system is illustrated. This telescopic optical system comprises a segmented primary mirror indicated at 32, which receives rays from a random scene 34 and reflects them to a secondary mirror 36 which, in turn, directs the rays through a central aperture 38 in the primary mirror. A grating 40 is disposed at the focal plane of the telescope optical system.

In a manner similar to that discussed in connection with the embodiment of FIG. 1, an apodizing mask 42 is disposed adjacent the grating 40, said mask having transparent portions and opaque portions. In one form of the invention, the mask is a circularly symmetrical transparency that is transparent at the center and opaque at the edge, as will be discussed more fully hereinafter. A field lens 43 is positioned adjacent the grating 40 to cause the segments 48 and 50 to be imaged on detectors 44 and 46, which are arranged so as to measure the tilt and alignment of these segments, respectively. As pointed out in connection with the embodiment of FIG. 1, the apodizing mask and the field lens can both be located on either side of the grating or either one can be located on one side of the grating and the other located on the other side of the grating.

As indicated hereinbefore in connection with the description of FIG. 1, means are provided for effecting relative movement between the grating 40 and the other elements of the system, as indicated by arrow 56, whereby random detail in the scene 34 is modulated by the fixed grating frequency. If there are aberrations in the telescope optics, the image of the scene produced by each subaperture will be laterally displaced in some way, depending upon the nature of the aberration, relative to the images produced by the other subapertures. These displacements produce differences in phase in the modulated signals at the output of the detectors. Phase detection electronics 58 receive the output from the detectors 44 and 46 and output individual detector signals to a processor 60, which determines the difference in phase between the individual detector signals and the average phase of all the detectors to thereby output a measure of the aberration at each segment 48 and 50. Position actuators 62 then correct the configuration of the segment, as necessary.

In a manner similar to that described in connection with FIG. 1, in the form of the invention where the telescope is stationary or fixed and the grating 40 is moved as indicated by arrow 56, the reference signal can be determined by picking the signal directly off the grating itself rather than averaging the signals from all of the detectors 44, 46. To implement this, a small light bulb 64 is fixedly mounted on the grating 40 to shine through and a photocell 66 detects same and generates a signal which is in perfect synchronism with the system. This signal is fed to the phase detection electronics 58 and is used as the reference signal to which the individual detector signals are compared. Typically, the sine and cosine components are detected or measured. That is, an in phase and quadrature detector is used to measure the signal and then the phase angle is computed in the processor 60 for each subaperture in the telescope optics. These phase angles are compared; thereby recreating the wavefront of the system.

In some embodiments of the invention a chromatic filter 67 is mounted at a suitable location in the optical path, such as for example, near the detectors, in the field lens or in the apodizing mask. This filter serves to enhance the contrast of the scene, which is desirable because it is the contrast or brightness variation of the extended scene that is going to give the signal.

It will be appreciated that the light detected in the foregoing embodiments is normally just a sample of the light impinging on the main telescope. As a result this light is normally off the edge of the useful or active field, or else a beam splitter is inserted in the light path to direct the main portion thereof to the scientific instruments and a small portion to the present system for determining aberrations.

An important element in the system of the present invention is the pupil stop. In the embodiments of FIGS. 1 and 2, the pupil stop is combined in association with the detectors. As a practical matter it is undesirable to locate obscurations at the aperture of the telescope. However, a reimaging system may be employed.

Figure 3:
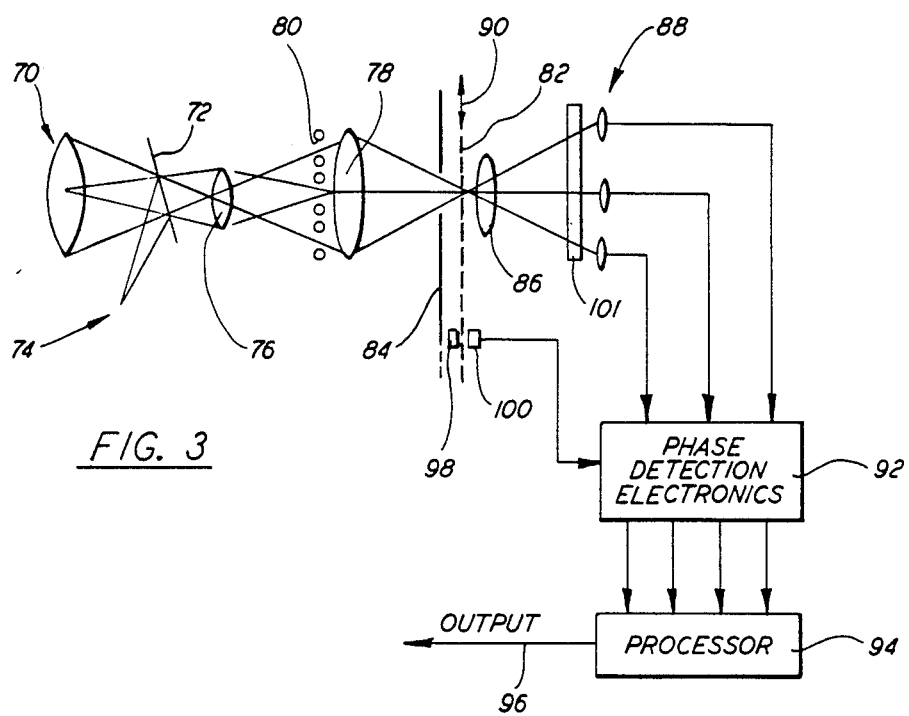
FIG. 3 is a schematic illustration of still another form of the invention.

Referring to the embodiment of FIG. 3, the telescope optical system is indicated at 70. A beam splitter 72 serves to direct the main portion of the light off to the scientific instruments as indicated at 74 and the small remaining portion of the light passes through the beam splitter to a first field lens 76, which creates an image of the telescope optical system. A reimaging lens 78 reimages the telescope optics. In view of the fact that the main portion of the light has been split off to the instrumentation, pupil stops 80 are mounted adjacent the reimaging lens 78. These pupil stops 80 literally obscure the portion of the light passing through the beamsplitter except for the holes therein where the light goes through. The remainder of the system of FIG. 3 is similar to that of FIGS. 1 and 2. Thus, a grating 82 is mounted at the focal plane and an apodizing mask 84 and a second field lens 86 are mounted adjacent thereto. The second field lens causes the subapertures of the main telescope to be imaged on an array of light detectors indicated at 88. In operation, there is relative movement between the grating and the other elements in the system, as indicated by arrow 90, whereby random detail in the scene is modulated. As pointed out hereinbefore, if there is an aberration in the telescope optics, the image of the scene produced by each subaperture will be laterally displaced relative to the images produced by the other subapertures. These displacements result as differences in phase in the modulated signals at the output detectors 88. Phase detection electronics 92 are provided for receiving the detector outputs and providing individual signals to a processor 94, which serves to determine the difference in phase between the individual detector signals and the average phase of all the detectors, whereby a measure of the aberration at each subaperture is effected, as indicated at 96.

Further, as discussed above, in the form of the invention where the telescope is stationary and the grating 82 is modulated, the reference signal can be determined by picking the signal directly off the grating itself instead of determining the average of all the detectors. For this purpose a small light bulb 98 is fixedly mounted on the rating 82 to shine through and a photocell 100 detects same and generates a signal which is in synchronism with the system. This signal is fed to the phase detection electronics 92 and used as the reference signal.

In some systems, a chromatic filter 101 is mounted at a suitable location in the optical path, such as for example, near the detectors, in the field lens or in the apodizing mask. This filter serves to enhance the contrast of the scene, which is desirable because it is the contrast or brightness variation of the extended scene that is going to give the signal.

It is noted that the systems of FIGS. 1 and 2 are quite similar to the system of FIG. 3. The system of FIG. 3 employs the Hartmann tester concepts whereas the systems of FIGS. 1 and 2 employ the lateral shear interferometer concept. The difference between them is only where the pupil stop, i.e. obscuration, is located. If the pupil stop is in front of the grating it is a Hartmann tester and if it is behind the grating it is a lateral shearing interferometer.

Figure 4:
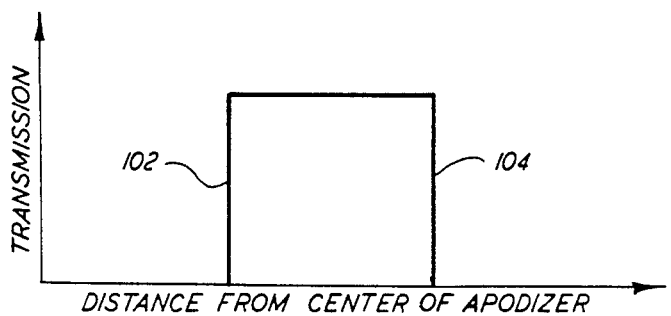
FIGS. 4 to 7 are graphs showing the relationship between transmission and the distance from the center of the apodizer for various apodizer configurations.
Figure 5:
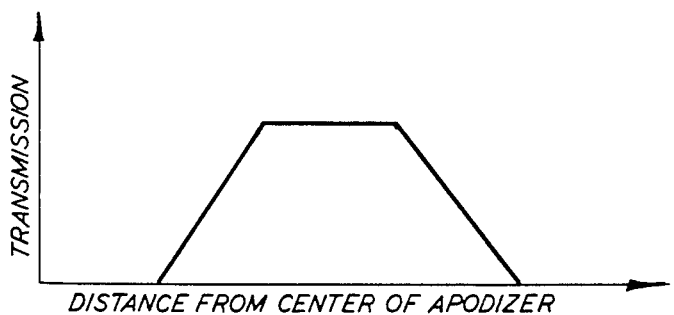
Figure 6:
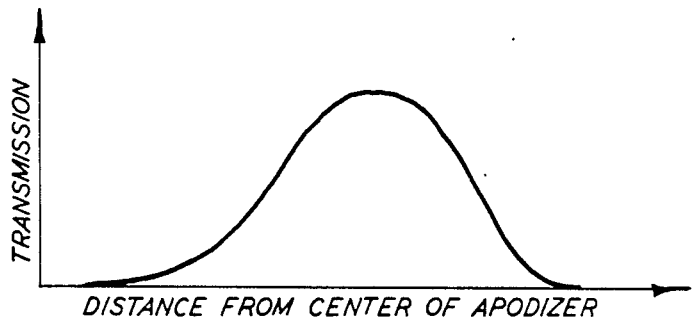
Figure 7:
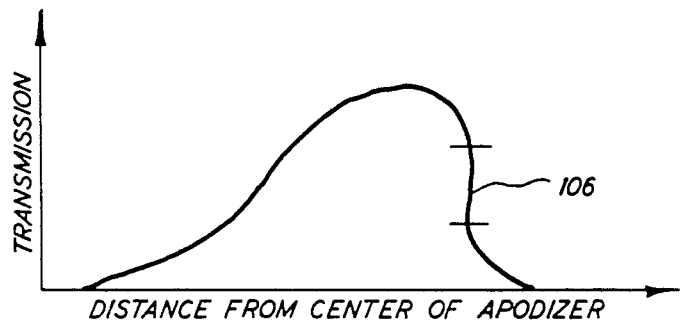

Considering the apodizing mask in more detail, in the embodiments where the whole telescope is moved or modulated across the scene, then the features of the mask become quite important. When the telescope is fixed and the grating is modulated, the properties of the apodizing mask become less important unless the telescope itself has jitter, uncertainty, or wander. FIGS. 4 to 7 show the relationship between transmission and the distance from the center of the apodizer for various apodizer configurations. Thus, FIG. 4 shows the case where no light passes through and then suddenly full light passes. This is an undesirable property because the gradients, i.e. the two edges 102 and 104 are infinitely sharp. The property that is desired in an apodizing mask is that this transition be gradual. FIGS. 5 and 6 illustrate two configurations of gradual transitions which are desirable. The point is to avoid any jumps or transition from light to dark or from opaque to another level or opaqueness, i.e. from about 20 percent to about 40 percent. FIG. 7 illustrates another configuration which is undesirable due to the sharp transition indicated at 106. The configurations of FIGS. 5 and 6 are both good. As a practical matter the configuration of FIG. 5 is probably easier to fabricate.

Figure 8:
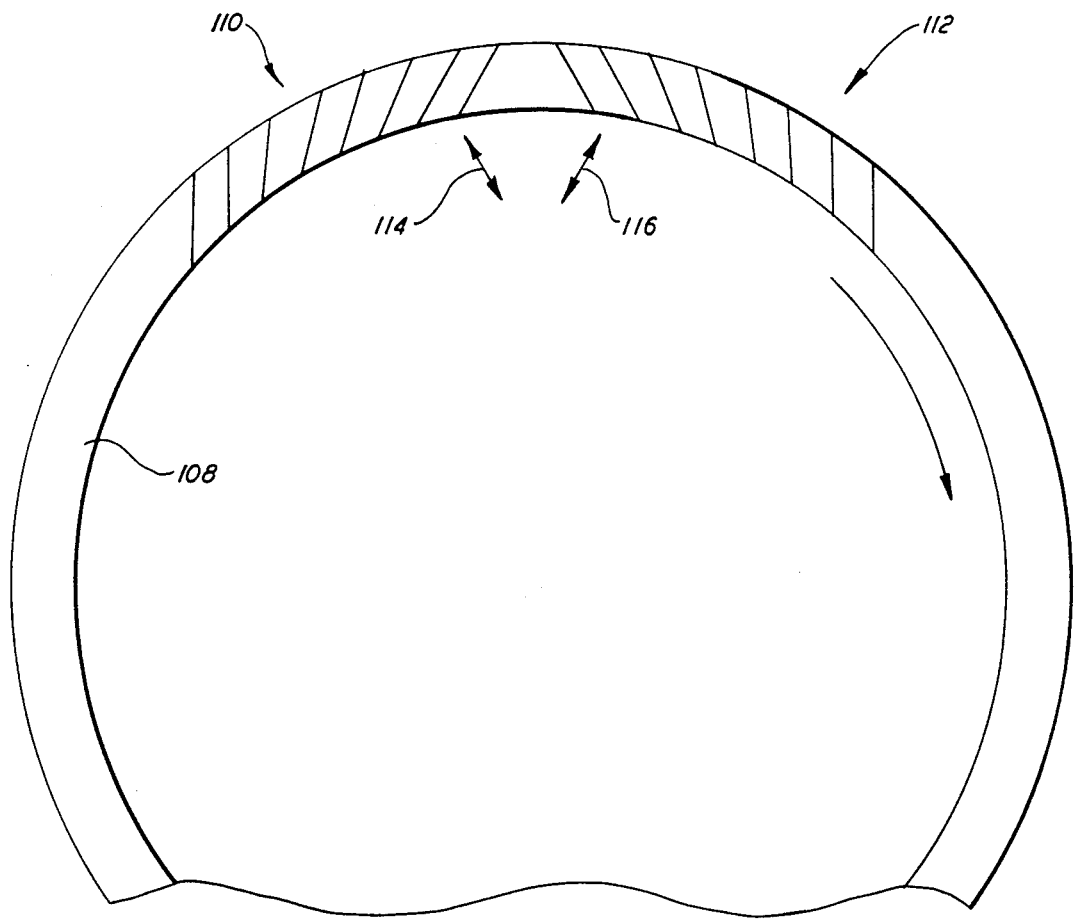
FIG. 8 is an enlarged plan view of a grating wheel according to one form of the invention.

It will be appreciated that is is desirable to measure displacement in two directions, i.e. up and down as well as sideways. If the grating only moves vertically and the lines thereon are horizontal, then only the vertical displacement of the light beam is measured. It would be possible to move the telescope in one direction and then replace the grating with a second grating and move the telescope in a second direction, but this is mechanically difficult to do. In order to measure the displacements in two directions, the grating is mounted on a wheel 108, as shown in FIG. 8. One half of the lines, indicated at 110, are slanted to the left at a 45 degree angle and the second half of the lines, indicated at 112, are slanted to the right at a 45 degree angle. As a result displacement is first measured as indicated by arrow 114 and then it is measured perpendicular thereto as indicated by arrow 116. Both of these measurements are detected by the detectors and thence processed in the processor as described hereinbefore. Alternatively, this same type of grating could be mounted on a linear element and reciprocated. Either the linear grating or the rotary grating could be used in any one of the various embodiments decribed above.

It will be appreciated that it is desirable for the grating to be constructed so as to have a smooth transition, i.e. a sinusoidal-like electrical amplitude transmission distribution as opposed to intensity transmission. Electric amplitude is proportional to the square root of the intensity. What is desired is the square root of the intensity in order to have a sinusoidal-like distribution in space.

In one form of the invention, the grating can be a reflecting grating instead of a transmission one. In this case it would have silver deposited on it. Further, it is possible to have a grating which is both transmissive and reflective. In this case there would be two sets of detectors, one set on each side. Both sets of detectors are looking at the same signal. When the signals are not being transmitted they are being reflected, thereby providing a push pull action. If the two signals are combined in the proper phase relationship they build up and help each other. This also reduces noise because noise is random whereas the signals are not.

Although certain particular embodiments of the invention are herein disclosed for purposes of explanation, various modifications thereof, after study of this specification, will be apparent to those skilled in the art to which the invention pertains, and reference should accordingly be had to the appended claims in determining the scope of the invention.

What is claimed is:

1. A system for determining optical aberrations in a telescope optical system comprising:
   said telescope optical system being arranged for imaging a scene;
   grating means disposed at a focal plane of said telescope optical system;
   an apodizing mask having transparent and opaque portions disposed adjacent said grating means wherein there is a gradual gradient transition between said transparent and said opaque portions;
   an array of light detectors, each of said light detectors being positioned to receive the image of a subaperture portion of said telescope optical system;
   field lens means disposed adjacent said grating for causing said subaperture portions of the telescope optical system to be imaged on said array of light detectors, respectively;
   means for effecting relative movement between said grating means and said telescope optical system;
   means responsive to said light detectors for determining the difference in phase between the individual detector signals and a reference phase;
   whereby a measure of the aberration at each subaperture portion of said telescope optical system is effected.

2. A system according to claim 1 wherein said means for effecting relative movement between said grating means and said other elements comprises means for moving said grating means, said system further comprising means for forming said reference phase comprising light means carried by said grating means, fixedly mounted detector means for detecting said light means and outputting a signal to said means for determining the difference in phase between the individual detector signals and a reference phase.

3. A system according to claim 1 wherein said telescope optical system comprises a segmented primary mirror and a facing secondary mirror, said primary mirror having a central aperture.

4. A system according to claim 1 wherein said means for determining the difference in phase between the individual detector signals and a reference phase comprises means for determining the average phase of all the detectors and using the average phase as the reference phase.

5. A system for determining optical aberrations in a telescope optical system comprising:
   said telescope optical system being arranged for imaging a scene;
   grating means disposed at a focal plane for said telescope optical system and comprising one set of grating lines disposed orthogonally with respect to a second set of grating lines;
   an apodizing mask having transparent and opaque portions disposed adjacent said grating means;
   an array of light detectors, each of said light detectors being positioned to receive the image of a subaperture portion of said telescope optical system;
   field lens means disposed adjacent said grating for causing said subaperture portions of the telescope optical system to be imaged on said array of light detectors, respectively;
   means for effecting relative movement between said grating means and said telescope optical system;
   means responsive to said light detectors for determining the difference in phase between the individual detector signals and a reference phase;
   whereby a measure of the aberration at each subaperture portion of said telescope optical system is effected.

6. A system for determining optical aberrations in a telescope optical system comprising:
   said telescope optical system being arranged for receiving light from a scene;
   a first field lens for creating an image of the telescope optical system;
   a beam splitter mounted between said telescope optical system and said first field lens for directing a portion of the light to said first field lens;
   a reimaging lens for reimaging said telescope optical system;
   a plurality of pupil stops disposed adjacent said reimaging lens;
   grating means disposed at a focal plane of said reimaging lens;
   an apodizing mask having transparent and opaque portions disposed adjacent said grating means, said apodizing mask having a gradual gradient transition between said transparent and opaque portions;
   an array of light detectors;
   a second field lens disposed adjacent said grating for imaging subaperture portions of said telescope optical system on said array of light detectors;
   means for effecting relative movement between said grating means and said telescope optical system;
   means responsive to said light detectors for determining the difference in phase between the individual detector signals and a reference phase;
   whereby a measure of the aberration at each subaperture portion of said telescope optical system is effected.

7. A system according to claim 6 wherein said means for effecting relative movement between said grating means and said other elements comprises means for moving said grating means, said system further comprising means for forming said reference phase comprising light means carried by said grating means, fixedly mounted detector means for detecting said light means and outputting a signal to said means for determining the difference in phase between the individual detector signals and a reference phase.

8. A system according to claim 6 wherein said means for determining the difference in phase between the individual detector signals and a reference phase comprises means for determining the average phase of all the detectors and using the average phase as the reference phase.

9. A system according to claim 6 further comprising chromatic filter means disposed in the light path.

* * * * *